US006800028B1

(12) United States Patent
Paludi

(10) Patent No.: US 6,800,028 B1
(45) **Date of Patent: *Oct. 5, 2004**

(54) GAME UTILIZING NON-IDENTICAL SEQUENTIAL IMAGES AS A WINNING CONDITION

(75) Inventor: Louis B. Paludi, 1004 Bay Dr., West Atlantic City, NJ (US) 08232

(73) Assignee: Louis B. Paludi, West Altantic City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/976,431

(22) Filed: Oct. 12, 2001

Related U.S. Application Data

(63) Continuation of application No. 09/528,702, filed on Mar. 17, 2000, now Pat. No. 6,319,123.

(51) Int. Cl.[7] .................................................. A63F 13/00
(52) U.S. Cl. ............................................ 463/25; 463/16
(58) Field of Search ................................. 463/1, 16–18, 463/20, 22, 25; 273/138.1, 138.2, 139, 143 R

(56) References Cited

U.S. PATENT DOCUMENTS 1,756,861 A 4/1930 Hoke, Jr.
2,061,221 A 11/1936 Craig
4,718,672 A * 1/1988 Okada .................... 273/143 R
5,560,603 A * 10/1996 Seelig et al. ............ 273/143 R
5,704,835 A 1/1998 Dietz, II
5,725,428 A 3/1998 Achmuller
5,735,743 A 4/1998 Murata et al.
5,779,544 A 7/1998 Seelig et al.
5,823,873 A 10/1998 Moody
6,062,980 A * 5/2000 Luciano ................... 273/138.2
6,135,885 A * 10/2000 Lermusiaux ................. 463/16
6,224,483 B1 * 5/2001 Mayeroff ..................... 463/16
6,375,568 B1 * 4/2002 Roffman et al. .............. 463/16

* cited by examiner

*Primary Examiner*—John M. Hotaling, II
*Assistant Examiner*—Aaron L. Enatsky

(57) ABSTRACT

A method of playing a game in which a library contains a plurality of events depicted in a series of sequential, non-identical images identified as a first image, a second image, etc. A first image selected from the plurality of first images in the library is displayed in a frame, such as a frame on a video monitor. Likewise, a selected one of the second images from the plurality of second images in the library is displayed in a second frame. If the images displayed in the frames sequentially depict the first and second images of the event, then a winning condition is achieved. An apparatus for performing the method is also disclosed.

50 Claims, 3 Drawing Sheets

GAME UTILIZING NON-IDENTICAL SEQUENTIAL IMAGES AS A WINNING CONDITION

CROSS-REFERENCE TO RELATED APPLICATION

This application is a continuation of U.S. Ser. No. 09/528,702, filed Mar. 17, 2000, now U.S. Pat. No. 6,319,123, the entirety of which is incorporated herein by reference.

BACKGROUND OF THE INVENTION

The present invention relates generally to games that utilize non-identical, sequential, related images as a winning condition. The game may be especially adapted for casino type wagering machines and may employ a sports theme, such as a football theme.

Casino slot machines initially used a series of rotatable mechanical reels, a mechanical arm to actuate the spinning of each reel, and a mechanism for stopping each reel at a randomly selected arcuate position. Each reel bore about its periphery a plurality of symbols such as oranges and cherries, and if identical symbols appeared in a horizontal row across the reels, then the player won a preselected amount of money or other prize.

Later slot machine developments employed three reels, and if identical symbols appeared across any one of three horizontal rows, or diagonally, then the player was awarded a preselected prize. Still later developments in video technology simulated the spinning of mechanical reels on a video monitor screen, usually randomly displaying symbols in a single row of three frames or in a so-called 3×3 array in which symbols were depicted in nine different frames arranged in a matrix of three columns and three rows. In this latter prior art version, a player could achieve a winning condition and a preselected amount of money if identical symbols appeared in any of the three horizontal rows or in any diagonal.

Other developments in slot machine technology permitted the player to initially spin all of the reels (or cause a virtual spin of all of the reels on a video monitor), decide whether to "hold" any of the reels in its position after the original spin, and then initiate another, second spin of the reels not "held", in an attempt to achieve a winning condition.

In another type of casino game involving draw poker, cards from a standard 52 card deck are randomly displayed on a video monitor in each frame in a row of five frames. The player may then decide which of the cards to "hold", and new cards from the remaining cards of the 52 card deck are then displayed in the frames that are not "held". The final five card hand appearing on the video monitor is then compared against conventional poker rankings to assess whether the player has achieved a winning condition which entitles the player to an award. It is also known that in such video poker games, a winning condition may be, for example, a sequential royal flush in which the cards appear sequentially in poker rank across the video screen, either from left to right, or from right to left.

The present invention generally relates to a game in which the winning condition is the at display of a series of non-identical, sequential, related images forming an event, such as pass play in the game of football.

SUMMARY OF THE INVENTION

The present invention relates to a method of playing a game in which a library contains a plurality of events depicted in a series of sequential, non-identical images identified as a first image, a second image, etc. A first image selected from the plurality of first images in the library is displayed in a frame, such as a frame on a video monitor. Likewise, a selected one of the second images from the plurality of second images in the library is displayed in a second frame. If the images displayed in the frames sequentially depict the first and second images of the event, then a winning condition is achieved. An apparatus for performing the method is also disclosed.

BRIEF DESCRIPTION OF THE DRAWINGS

The present invention will be described with reference to the accompanying drawings, wherein.

DESCRIPTION OF THE PREFERRED EMBODIMENT

Figure 1:
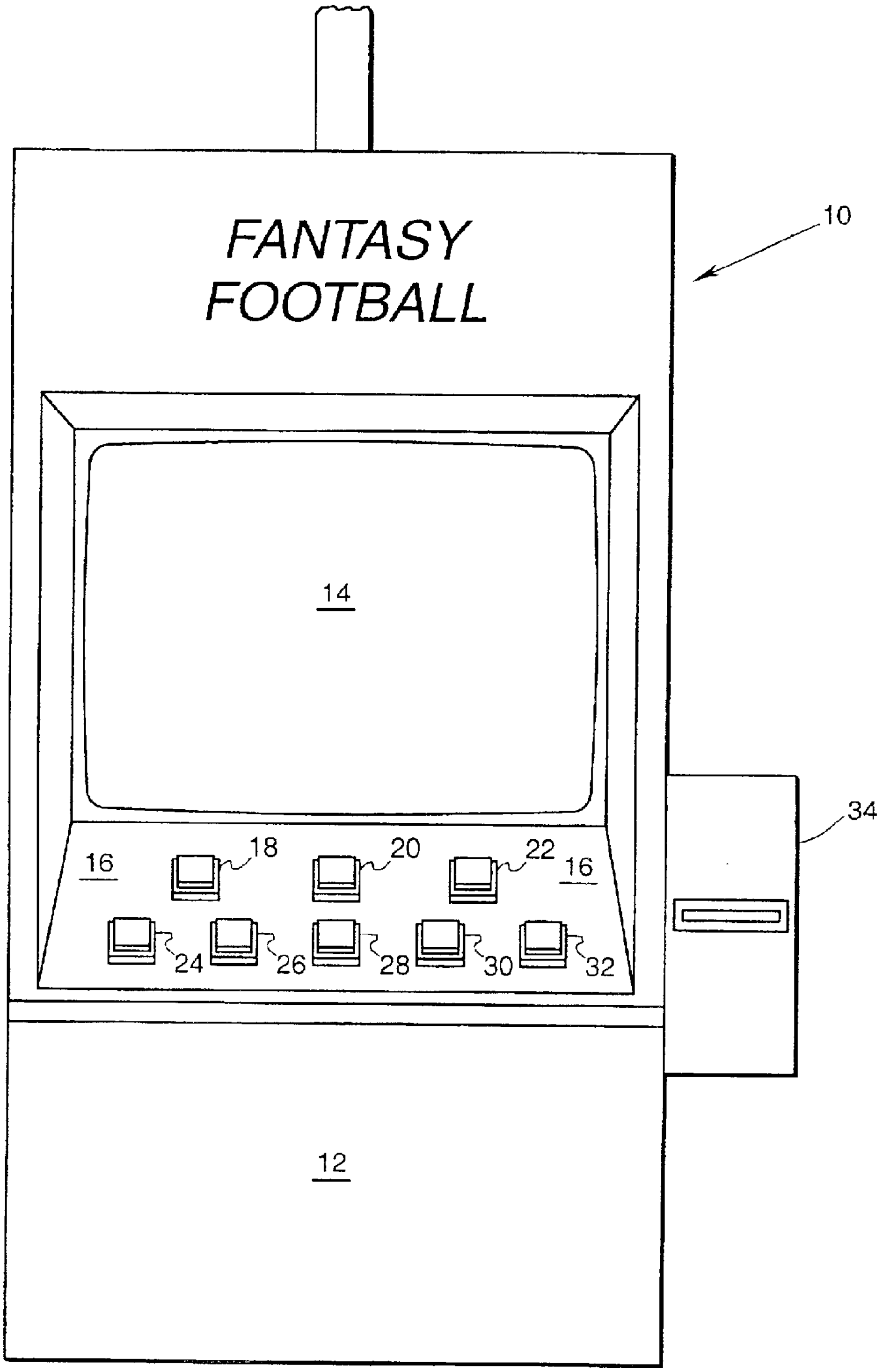
FIG. 1 is a plan, schematic view of a casino machine capable of being utilized in the game of the present invention.

The invention will be described with reference to the accompanying drawings, wherein like reference numerals refer to the same item.

There is shown in FIG. 1*a* video type casino game machine 10 including a box shaped housing 12. The front face of the housing 12 typically bears graphic designs associated with the game, which may include the name of the game, which in the illustrated example is "FANTASY FOOTBALL". A video monitor 14 is mounted in the housing 12 for the video display of various information pertaining to the game. An inclined ledge or surface is disposed immediately below the video monitor 14 and includes a player control panel 16 which in turn includes several manually activated buttons 18, 20, 22, 24, 26, 28, 30, and 32, which are used by a player to control various aspects of the play of the game. Player game commands may also be implemented by means of conventional touch screen technology as an alternative to, or in addition to, commands initiated through manually depressing the player control buttons. The machine 10 also includes a bill validator or acceptor 34 by which a player may insert paper money and obtain credits in connection with the play of the game. The foregoing type of casino machine is well-known in the industry.

The game of the instant invention will be described with reference to a football game, although it should be appreciated that the instant invention is not limited in the scope to this specific, preferred embodiment. Several different series of sequential images forming an event may be inputted into a microprocessor memory or library. For example, the events may be a pass play, a run play, a punt return, a kick off return, a field goal attempt, a safety, a pass interception, and a fumble recovery. Each event is formed by at least two separate, non-identical images which illustrate a sequence of the event. In a sense, the preferred embodiment includes "still" images occurring at different sequential times during the event. For example, the event of a pass play may be illustrated by three separate, non-identical images as follows: a first image showing a football player in a position of throwing a football, a second image of a football in the air and heading toward a receiver, and a third image of a receiver catching the football. Similarly, the event of a run play may be illustrated by three images as follows: a first image of a player handing the football to a running player, a second image of the player running with the football through the line of scrimmage, and a third image of the player running with the football and pursued by opposing players.

It will be appreciated that a player of the casino game would identify with players having uniforms of a particular color or style and that players depicted with uniforms of a different color or style would be considered opposing players. The event of a pass interception right be depicted by three separate, non-identical images as follows: a first image depicting an opposing player (i.e., with an opposing player's uniform) in a position ready to pass the football, a second image of a football in the air and heading toward both an opposing player and a player identified with the casino game player, and a third image of the ball being caught by the player identified with the casino player.

Figure 2:
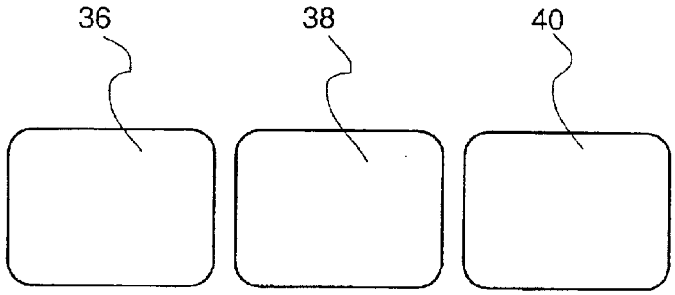
FIG. 2 is a schematic illustration of a single row of three frames that may be utilized in the game of the present invention.

For purposes of example, consider that the game includes seven different events related to a football game, and that each event is depicted by three separate, non-identical images, which sequentially illustrate the event. These images are inputted into a microprocessormemory or library. The microprocessor is programed so that it can display the images into a template portrayed on the video monitor 14 as three frames, 36, 3 8, and 40 arranged in a horizontal row, as illustrated in FIG. 2. Each of the frames 36, 38, and 40 is substantially square, however, it should be appreciated that the frame configuration may assume a variety of different shapes. The microprocessor is programmed to randomly generate a selected one of the seven first images in the left most frame 36, to randomly generate a selected one of the seven second images in the middle frame 38 and to randomly generate a selected one of the seven third images in the right most frame 40. If the images displayed in the frames 36, 38, and 40 sequentially illustrate a single event, then a winning condition has been achieved. It will be appreciated that the odds of obtaining such a winning condition are one in 49. Alternatively, if any two of the frames contain images of a single event, then a different winning condition (with a lesser payback to the casino game player) is achieved.

In another, alternative embodiment, after the microprocessor initially randomly generates each of the images in the frames 36, 38, and 40, the player may selectively decide to "hold" any of the images, by manually depressing a "hold" button in a well-known manner. The player will then depress another player control button by which the microprocessor will randomly generate images in the frames that were not "held". In this latter embodiment, the player is allowed a second chance to achieve a winning condition.

In yet another embodiment, after the player is allowed a second chance as described above, the player may again selectively "hold" the images in any of the frames and command the microprocessor to again randomly generate an image in each of the frames that were not "held". Thus the player may be allowed a third chance to achieve a winning condition. When the instant invention is used in connection with a football type game, this alternative embodiment in essence gives the player three downs to achieve a winning condition.

It should be appreciated that the images might be purely randomly generated, or that the frequency of the appearance of certain images might be weighted relative to the frequency of the appearance of other images.

It should be appreciated that the instant invention may be utilized with mechanical reels instead of a video monitor 14 and that the video monitor 14 may display an imaginary, mechanical reel, also known as a virtual reel, which creates the visual sensation that a reel is spinning, or the video monitor 14 may simply flash the images into the frames 36, 38, 40.

It should also be appreciated that although the frames 36, 38, and 40 have been arranged horizontally on the video monitor 14, the frames could be arranged vertically, or in some other direction or alignment.

In order to assist the casino game player in assessing which event an image appearing in a frame 36, 38, 40 in part illustrates, the present invention contemplates that the image appearing in each of the frames, 36, 38, and 40 may include a written description of the event with which the image is associated, for example, the first image of a pass play appearing in frame 36 might include the words "PASS PLAY".

The invention also contemplates that if all three images appearing in frames 36, 38, 40 illustrate a single event, such as a pass play then immediately afterward the microprocessor may generate on the video monitor 14 a brief (e.g., 3 second) fluid motion picture showing an entire pass play, which may be accompanied by sound effects such as cheers.

The game of the instant invention also contemplates that if a player achieves a certain winning condition in the game, such as by achieving images in frames 36, 38, 40 which form a single event, then the game may entitle the player to participate in a secondary game, with the possibility of winning an additional award. For example, if a player achieves the winning condition of a pass play event depicted in the frames 36, 38, 40, the microprocessor might allow a player to spin another virtual reel to determine whether the football player has scored. The images associated with the second game, for example, might appear on a real or virtual reel and may comprise only two images, one of a referee raising both hands in a position indicating a "score", and the other illustrating a referee in the position of crossing his hands in front of his body, indicating no score. These two images need not be randomly generated on a 50% odds basis, but may be generated on some sort of weighted basis.

It is also contemplated that the game of the instant invention might offer a tertiary game whereby, for example, if the player achieves a winning pass play event in frames 36, 38, 40 and achieves a score in the secondary game, then the player may participate in a tertiary game in which several other images may be generated, which images might include, for example, a point after touchdown kick that is no good, a point after touchdown kick that is good, a points after touchdown run which is no good, a points after touchdown run which is good, a points after touchdown pass which is no good, a points after touchdown pass which is good. If there is a point or points after touchdown play that is good, then the player achieves yet a third winning condition and is entitled to additional award. The award for a good points after touchdown may be double the award for a good point after touchdown. Again the images in a third game either may be or need not be randomly generated by the microprocessor. It is contemplated that the tertiary game would not be afforded to a player who has achieved either a safety or a field goal attempt in the first game and a score in the second game. It is also contemplated that the award for a safety would be only one-third of the value of an award for a score on a run play, a pass play, etc., and that the award for a score on a field goal would be only one-half of the value of an award for a score on a run play, a pass play, etc.

Figure 3:
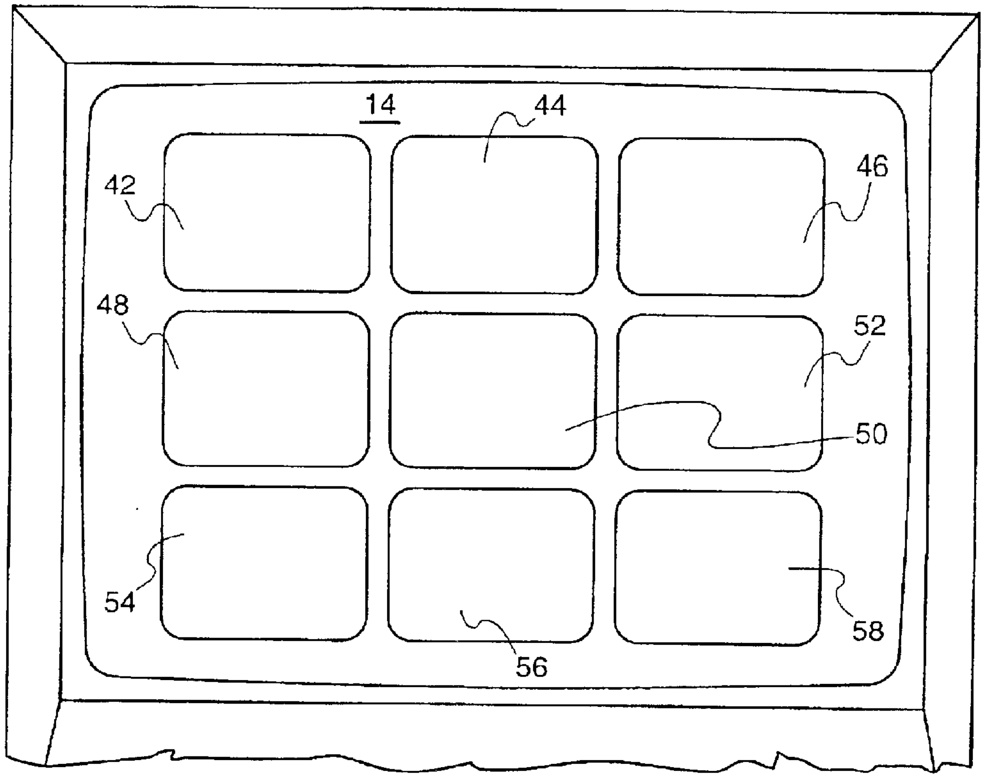
FIG. 3 is a schematic illustration of a video monitor containing a 3×3 matrix array of frames that may be utilized in the game of the present invention.

There is shown in FIG. 3 a video monitor 14 which includes a conventional so-called, 3×3 array or matrix of frames 42–58. Such an array may be used in yet another embodiment of the present invention. In such an embodiment, a microprocessor generates a first image from its library of first images for each of the frames 42, 48, 54 in the left-most column of frames, generates a second image from its library of second images for each of the frames 44, 50, 56 in the middle column of frames, and generates a third image from its library of third images for each of the frames 46, 52, 58 in the third column. If three images forming an event are in any horizontal row or in either of the two diagonally arranged frames (frames 42, 50, 58 and frames 54, 50, and 46), then the player achieves a winning condition. In the embodiment shown in FIG. 3, if the player is allowed to "hold" the images in certain frames, then it is preferred that such commands be initiated by touch screen, rather than by player controlled buttons. The embodiment shown in FIG. 3 may also include secondary games and tertiary games as described above.

It should be appreciated that the array may be, for example, 1×2, 1×3, 1×4, etc., or 2×2,2×3, 2×4, etc., or 3×2, 3×3,3×4, etc., or 4×2, 4×3, 4×4, etc. and so forth.

Figure 4:
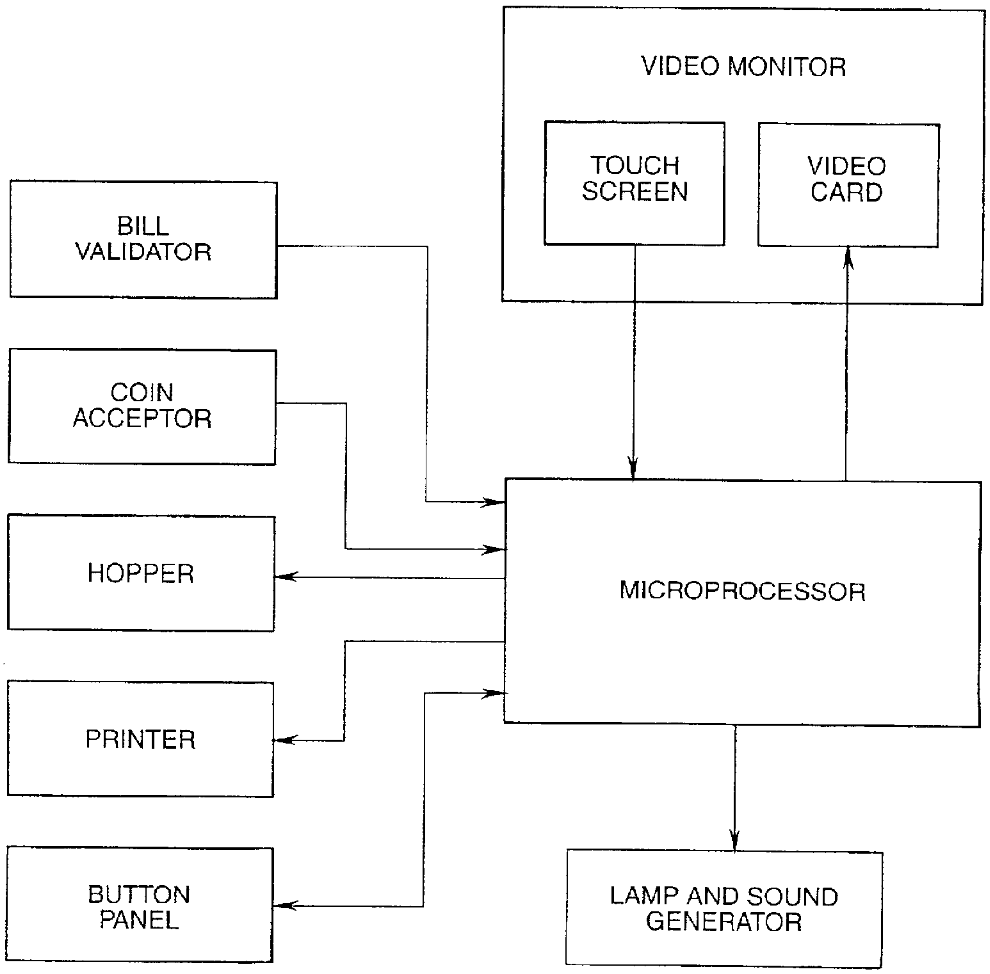
FIG. 4 is a block diagram schematically showing the control system that may be utilized in the casino machine shown in FIG. 1.

FIG. 4 comprises a block diagram that schematically illustrates a control system that may be utilized with the casino game machine shown in FIG. 1.

It should be appreciated that the instant invention may include themes and events involving sports other than football, such as ice hockey, soccer, baseball, and basketball. The invention also contemplates that the events contained in the library may contain a mixture of sporting events, such as three sequential images illustrating a high jump event, three separate images illustrating a pole vault event, three separate images illustrating a high dive event, three separate images illustrating an aerial ski jump event, etc. Moreover, it should be appreciated that the event need not be sports related, but, for example, may depict a rocket launch to the moon, a trip to the supermarket, or a series of job promotions.

The invention also contemplates that color or colors associated with the graphic designs appearing on the machine housing 12 or on the border of the video monitor 14 may correspond with the color or colors of the uniform of the football player which is identified with the casino player. For example, the machine housing 12 may be painted in a red and gray color theme and the football players appearing in the video monitor 14 include players having a red and gray colored uniform, which players are identified with the casino player. By way of farther example, the three images in a pass play would show a player in a position of passing the ball appearing in a red and gray uniform and the player who is about to catch the ball also appearing in a red and gray uniform. In contrast, for an event comprising three images of a pass interception, the player shown in a position of passing the ball would be in a uniform having colors distinctly different from red and gray, and the player shown catching the ball (intercepting the ball) would be shown in a red and gray uniform.

Those skilled in the art will also appreciate that the game of the instant invention may be used in a tournament format in which several players independently play a corresponding machine 10, each player starting with an equal amount of credits. At the end of a prescribed time period, the player or a certain number of players with the highest credits will advance to the next round of the tournament, until a winner or winners are designated. In a similar fashion, each player may represent a football team, and after an initial round, the teams with the highest credits will advance to the playoffs. In such a format, the player/team having the highest credits at the end of the initial round will play against the player/team that made the playoffs with the lowest amount of credits at the end of the initial round, until all but one of the players/teams is eliminated. The final round will pit two players against each other in something akin to a "Super Bowl".

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts or types of material within the principles of the invention to the full extent indicated by the broad general meaning of the terms in which the appended claims are expressed.

Although particular embodiments of the present invention have been described and illustrated herein, it should be recognized that modifications and variations may readily occur to those skilled in the art and that such modifications and variations may be made without departing from the spirit and scope of my invention. Consequently, my invention as claimed below may be practiced otherwise than as specifically described above.

I claim:

1. A method of playing a video game comprising the steps of:

maintaining a library containing a plurality of series of non-identical images illustrating situations occurring at different sequential times during an event, with each series depicting a different event, with N total images in each series, where N is an integer equal to or greater than two, each of the images in each series identified as an nth time image, where the n+1 time image occurs in time sequence later than the nth time image, where n is an integer equal to or between one and N inclusive;

providing an array of frames arranged in a prescribed arrangement;

displaying in a selected frame a selected one of the nth time images from said library;

displaying in another selected frame a selected one of the nth+1 time images from said library;

establishing as a first winning condition the display in the selected frames of one of the series of time sequenced images depicting an event.

2. A method according to claim 1 wherein said library contains at least three series, wherein there are at least three images in each series, and wherein the array includes at least nine frames arranged in at least three vertically oriented columns and at least three horizontally oriented rows.

3. A method according to claim 2 comprising the further step of establishing as a second winning condition the display in the frames diagonally extending through the columns and rows one of the series of time sequenced images depicting an event.

4. A method according to claim 1 wherein each of the events comprises a sports activity.

5. A method according to claim 4 wherein each of the events comprises a race activity.

6. A method according to claim 4 wherein each of the events comprises a football game activity.

7. A method according to claim 1 comprising the further step of providing a secondary game by which a second winning condition may be attained if said first winning condition is attained, said second winning condition being different from said first winning condition.

8. A method according to claim 6 comprising the further step of providing a secondary game by which a second winning condition may be attained if said first winning condition is attained, said second winning condition being different from said first winning condition.

9. A method according to claim 8 wherein said secondary winning condition comprises a football game scoring play.

10. A method according to claim 1 comprising the further step of awarding a prize to a player of the game who achieves said winning condition.

11. A video game apparatus comprising;

means for maintaining a library containing a plurality of series of non-identical images illustrating situations occurring at different sequential times during an event, with each series depicting a different event, with N total images in each series, where N is an integer equal to or greater than two, each of the images in each series identified as an nth time image, where the n+1 time image occurs in time sequence later than the nth time image, where n is an integer equal to or between one and N inclusive;

means for providing an array of frames arranged in a prescribed arrangement;

means for displaying in a selected frame a selected one of the nth time images from said library;

means for displaying in another selected frame a selected one of the nth+1 time images from said library; and means for identifying as a first winning condition the display in the selected frames of one of the series of time sequenced images depicting an event.

12. A method of playing a video game comprising the steps of:

maintaining a library containing at least three series of non-identical images illustrating situations occurring at different sequential times during an event, with each series depicting a different event, with N total images in each series, where N is an integer equal to or greater than two, each of the images in each series identified as an nth time image, where the n+1 time image occurs in time sequence later than the nth time image, where n is an integer equal to or between one and N inclusive;

providing an array of at least three frames in a prescribed arrangement;

displaying in a first selected frame a selected one of the first nth time images from said library;

displaying in a second selected frame a selected one of the nth+1 time images from said library;

displaying in a third selected frame a selected one of the third nth+2 time images from said library;

establishing as a first winning condition the display in the three selected frames of one of the series of time sequenced images depicting an event.

13. A method according to claim 12 wherein said three selected frames are located adjacent to each other in said array.

14. A method according to claim 12 wherein said first selected frame is located to the left of said second selected frame, and wherein said second selected frame is located to the left of said third selected frame.

15. A method according to claim 12 wherein each of the events comprises a sports activity.

16. A method according to claim 15 wherein each of the events comprises a race activity.

17. A method according to claim 15 wherein each of the events comprises a football game activity.

18. A method according to claim 12 comprising the further step of providing a secondary game by which a second winning condition may be attained if said first winning condition is attained, said second winning condition being different from said first winning condition.

19. A method according to claim 17 comprising the further step of providing a secondary game by which a second winning condition may be attained if said first winning condition is attained, said second winning condition being different from said first winning condition.

20. A method according to claim 19 wherein said secondary winning condition comprises a football game scoring play.

21. A method according to claim 12 comprising the further step of awarding a prize to a player of the game who achieves said winning condition.

22. A video game apparatus comprising:

means for maintaining a library containing at least three series of non-identical images illustrating situations occurring at different sequential times during an event, with each series depicting a different event, with N total images in each series, where N is an integer equal to or greater than two, each of the images in each series identified as an nth time image, where the n+1 time image occurs in time sequence later than the nth time image, where n is an integer equal to or between one and N inclusive;

means for providing an array of at least three frames in a prescribed arrangement;

means for displaying in a first selected frame a selected one of the nth images from said library;

means for displaying in a second selected frame a selected one of the nth+1 images from said library;

means for displaying in a third selected frame a selected one of the nth+2 images from said library; and means for identifying as a first winning condition the display in the three selected frames of one of the series of time sequenced images depicting an event.

23. A method of playing a video game comprising the steps of:

maintaining a library containing a plurality of series of non-identical images illustrating situations occurring at different sequential times during an event, with each series depicting a different event, with N total images in each series, where N is an integer equal to or greater than two, each of the images in each series identified as an nth time image where the n+1 time image occurs in time sequence later than the nth time image, where n is an integer equal to or between one and N inclusive;

(a) providing an array of image display regions arranged in a prescribed arrangement, each region adapted for displaying one of said images to a player;

(b) designating a first one of said image display regions in which to display one of the nth time images;

(c) selecting one of the nth time images from said library;

(d) displaying said selected one of the nth time images in said designated first one of said image display regions in which to display said selected one of the nth time images;

(e) designating a second one of said image display regions in which to display one of the nth+1 time images;

(f) selecting one of the nth+1 time images from said library;

(g) displaying said selected one of the nth+1 time images in said designated second one of said image display regions in which to display said selected one of the nth+1 time images;

(h) establishing as a first winning condition the display in said designated first one of said image display regions and in said designated second one of said image display regions, a time image and an nth+1 time image, respectively, of one of the series of time sequenced images depicting an event.

24. A method according to claim 23 wherein in steps (b) and (e) occur before steps (c) and (f).

25. A method according to claim 23 wherein in step (c) one of the nth time images is randomly selected from substantially all of the nth time images contained in said library and wherein in step (f) one of the nth+1 time images is randomly selected substantially all of the nth+1 time images contained in said library.

26. A method according to claim 24 wherein in step (c) one of the nth time images is randomly selected from substantially all of the nth time images contained in said library and wherein in step (f) one of the ed nth+1 time images is randomly selected substantially all of the nth+1 time images contained in said library.

27. A method according to claim 23 wherein steps (d) and (g) substantially overlap in time.

28. A method according to claim 24 wherein steps (d) and (g) substantially overlap in time.

29. A method according to claim 25 wherein steps (d) and (g) substantially overlap in time.

30. A method according to claim 26 wherein steps (d) and (g) substantially overlap in time.

31. A method according to claim 23 wherein each of the events comprises a sports activity.

32. A method according to claim 31 wherein each of the events comprises a race activity.

33. A method according to claim 31 wherein each of the events comprises a football game activity.

34. A method according to claim 33 wherein said winning condition comprises a football game scoring play.

35. A method according to claim 23 comprising the further step of awarding a prize to a player of the game who achieves said winning condition.

36. A method of playing a video game comprising the steps of:

maintaining a library containing a plurality of series of non-identical images illustrating situations occurring at different sequential times during an event, with each series depicting a different event, with N total images in each series, where N is in integer equal to or greater than two, each of the images in each series identified as an nth time image, where the n+1 time image occurs in time sequence later than the nth time image, where n is an integer equal to or between one and N inclusive;

(a) providing an array of at least three image display regions in a prescribed arrangement, each region adapted for displaying one of said images to a player;

(b) designating a first set of at least one of said image display regions in which to display a first group of at least one of the nth time images;

(c) selecting said first group of nth time images from said library;

(d) displaying said selected first group of nth time images in said first set of image display regions;

(e) designating a second set of at least one of said image display regions in which to display a second group of at least one of the nth+1 time images;

(f) selecting said second group of nth+1 time images from said library;

(g) displaying said selected second group of nth+1 time images in said second set of image display regions;

(h) designating a third set of at least one of said image display regions in which to display a third group of at least one of the nth+2 time images;

(I) selecting said third group of nth+2 time images from said library;

(j) displaying said selected third group of nth+2 time images in said third set of image display regions;

(k) establishing as a first winning condition the display in one of said first set of image display regions, in one of said second set of image display regions, and in one of said third set of image display regions, an nth time image, an nth+1 time image, and an nth+2 time image, respectively, of one of the series of time sequenced images depicting an event.

37. A method according to claim 36 wherein in step (a) at least three of said image display regions are aligned substantially linearly and in step (k) the ones of said first set of image display regions, said second display regions, and said third display regions are aligned substantially linearly in said array of at least three image display regions.

38. A method according to claim 36 wherein said array includes at least nine image display regions disposed substantially in a regular pattern of at least three rows and three columns.

39. A method according to claim 37 wherein said array includes at least nine image display regions disposed substantially in a regular pattern of three rows and three columns.

40. A method according to claim 39 wherein in step (k) said substantially linear alignment includes a row of three image display regions.

41. A method according to claim 39 wherein in step (k) said substantially linear alignment extends substantially diagonally.

42. A method according to claim 36 wherein the number of nth time images in said selected first group equals the number of image display regions in said first set, the number of nth+1 time images in said selected second group equals the number of image display regions in said second set, and the number of nth+2 time images in said selected third group equals the number of image display regions in said third set.

43. A method according to claim 36 wherein steps (b), (e), and (h) occur before steps (c), (f), and (I).

44. A method according to claim 36 wherein in step (c) said first group is randomly selected from substantially all of the nth time images contained in said library, wherein in step (f) said second group is randomly selected from substantially all of the nth+1 time images contained in said library, and wherein in step (I) said third group is randomly selected from substantially all of the nth+2 time images contained in said library.

45. A method according to claim 36 wherein steps (d), (g), and (j) substantially overlap in time.

46. A method according to claim 36 wherein each of the events comprises a sports activity.

47. A method according to claim 46 wherein each of the events comprises a race activity.

48. A method according to claim 46 wherein each of the events comprises a football game activity.

49. A method according to claim 48 wherein said winning condition comprises a football game scoring play.

50. A method according to claim 36 comprising the further step of awarding a prize to a player of the game who achieves said winning condition.

* * * * *